United States Patent
Friedman

[11] 3,944,125
[45] Mar. 16, 1976

[54] CONTAINER

[76] Inventor: Jack Friedman, 250 Kensington, Westmount, Quebec, Canada

[22] Filed: Oct. 9, 1974

[21] Appl. No.: 513,231

[52] U.S. Cl. ........................... 229/3.1; 229/3.5 MF
[51] Int. Cl.² ...................... B65D 5/40; B65D 25/14
[58] Field of Search ...................... 229/3.1, 3.5 MF; 117/161 UH

[56] References Cited
UNITED STATES PATENTS

| | | | |
|---|---|---|---|
| 2,555,315 | 6/1951 | Carroll | 229/3.1 UX |
| 3,170,568 | 2/1965 | Carter | 229/3.1 X |
| 3,207,410 | 9/1965 | Dobbins et al. | 229/3.1 |
| 3,215,050 | 11/1965 | Schroeder | 229/3.1 X |
| 3,297,225 | 1/1967 | Bransten | 229/3.5 MF |
| 3,303,322 | 12/1942 | Bigger | 229/3.1 X |
| 3,369,932 | 2/1968 | Sawyer, Jr. | 117/161 UH |
| 3,454,207 | 7/1969 | Jackson | 229/3.1 |
| 3,468,703 | 9/1969 | Gibbs et al. | 117/161 UH |
| 3,497,380 | 2/1970 | Weber | 117/161 UH |

*Primary Examiner*—Davis T. Moorhead
*Attorney, Agent, or Firm*—Wolf, Greenfield & Sacks

[57] ABSTRACT

A container comprising a side wall formed from paper. A bottom end sealing disc is secured to the bottom of the side wall. A single oil impervious resin lacquer is then applied to cover the inner surface of the sidewall and the exposed joints between the side wall and the bottom end. The impervious resin is partially impregnated into the side wall. The disclosure also relates to a method of forming such container.

5 Claims, 3 Drawing Figures

INVENTOR
Jack FRIEDMAN

Alan Swabey
ATTORNEY

CONTAINER

BACKGROUND OF THE INVENTION

1. Field of the Invention

This invention relates to containers and more particularly to a paperboard type container especially adapted to contain oil liquid contents, solid or liquid food or any other type of material.

2. Description of the Prior Art

Heretofore, paperboard oil containers have been provided. One disadvantage of the known paperboard containers is that they are constructed from a convolute or spiral wound paperboard tube and leakage often takes place between the joints of the convolute or spiral winding and the joints formed at the interconnection of the bottom end of the container with its end sealing disc. Some container constructions utilize a silver paper covering over the inner side wall surface of the container or a plastic coating over the convolute or spiral joints in an attempt to eliminate the leakage problem.

A further problem is that once the paperboard is impregnated with oil it tends to shrink and thereby loosening the convolute or spiral joints and the joint with the bottom metallic sealing disc resulting in leaky joints.

SUMMARY OF THE INVENTION

It is a feature of the present invention to provide a container structure and method of making same which substantially eliminates the leakage problems and which is economical to manufacture.

Accordingly, from a broad aspect, the present invention provides a container comprising a side wall formed from paper. A bottom end sealing disc is secured to the bottom of the side wall. A single oil impervious resin lacquer is then applied to cover the inner surface of the side wall and the exposed joints between the side wall and the bottom end. The impervious resin is partially impregnated into the side wall.

From a further broad aspect, the present invention further provides a method for the fabrication of a container suitable for oil liquid contents comprising the steps of forming a side wall by overlapping and bonding a plurality of layers of a paperboard sheet. A bottom end sealing disc is then secured to the bottom periphery of the side wall. A synthetic resin lacquer lining is then sprayed over the inner surface of the side wall and the bottom end sealing disc to substantially seal the pores of the paperboard on the inner surface of the side wall and the exposed joints on the inner surface of the container.

BRIEF DESCRIPTION OF THE DRAWINGS

The invention will now be described with reference to a preferred embodiment as illustrated by the drawings in which.

DESCRIPTION OF THE PREFERRED EMBODIMENT

Figure 1:
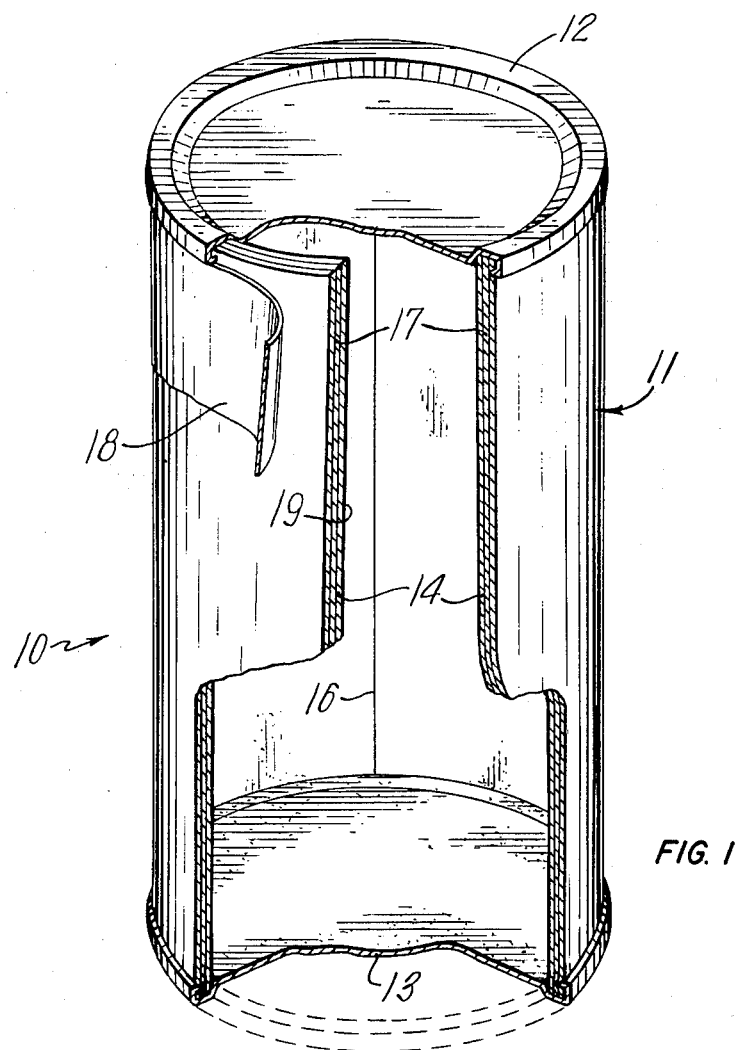
FIG. 1 is a fragmented perspective of the paperboard container.

Referring now to the drawings and more particularly to FIG. 1, there is shown generally at 10, a container especially constructed for oil liquid contents. The completed container 10 comprises essentially a paperboard cylinder constituting a side wall 11 and a top and bottom end sealing disc, 12 and 13 respectively. The bottom sealing disc 13 is formed of 9–10 gauge tin whilst the top disc 12 may be of a lower gauge metal. The sealing discs 12 and 13 are crimped about a respective outer periphery of the cylindrical side wall 11. Although this embodiment shows a cylindrical side wall, the container may be of rectangular configuration and constructed of other materials, for example, fiberboard.

Figure 2:
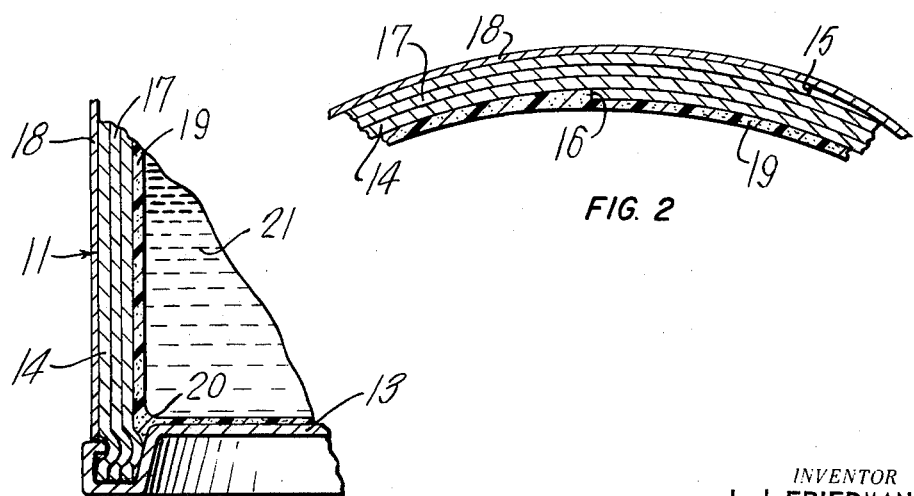
FIG. 2 is a section view of the paperboard seams.

The side wall 11 is formed from a straight convolute or spiral wind of paperboard material 14 which is rolled three times and bonded as shown in FIG. 2. Each layer of paperboard material is of approximately 12 mils, and may also vary between 8 and 15 mils thus forming a paperboard side wall having a thickness of approximately 37 mils it being understood that the total range may vary between 24 and 45 mils. The vertical wound ends of the paperboard material are overlapped to form an outer surface seam 15 and an inner surface seam 16. The intermediate layer is shown at 17. An outer wrapper, hereinshown as a silver paper covering 18, is then fastened about the outer surface of the paperboard material 14. The silver paper 18 is in single sheet form and is overlapped in an area of the outer surface of the paperboard material 14, remote from the seams 15 and 16. This silver paper 18 provides an outer insulating layer to the paperboard protecting it against exposure to rain, sunlight, etc. The silver sheet 18 also serves as the label for the container.

Figure 3:
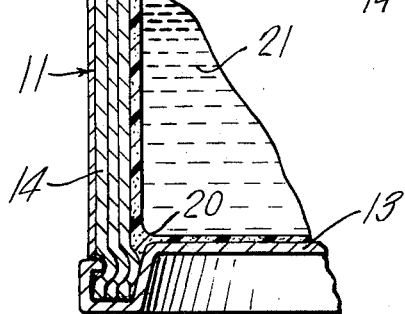
FIG. 3 is a section view of a portion of the container filled with oil and illlustrating part of the end sealing disc and the cardboard side wall.

The side wall 11 and the bottom disc 13 are assembled in the conventional manner and the inner surface of the paperboard material 14 and the bottom end sealing disc 13 are coated with a spray, in the cold at room temperature, under pressure of approximately 100–120 lbs., with a sufficient quantity of lacquer of a synthetic oleo-phobic resin emulsion, for example polyvinylidene chloride aqueous emulsion, to form a sealed inner lining 19 sealing substantially all the paperboard pores and exposed joints such as at 20. Because the polyvinylidene chloride is applied under a predetermined pressure and the paperboard is porous, the polyvinylidene chloride impregnates the paperboard to a depth of approximately 3 to 5 mils and, when dry, forms a tough flexible inner skin providing an improved protection of the side wall and the contents against external influences of sunlight, heat, cold, water, ect., and preventing leakage of its contents. The total thickness of the lining 19 is approximately 4 to 6 mils with 3 to 5 mils of this thickness impregnated in the paperboard. In FIG. 3 the lining is shown out of proportion to better illlustrate the invention. Although almost any type of polyvinylidene chloride aqueous emulsion can be used for producing the inner lining 19, coatings known under the trademarks DARAN 220, DARAN 225, DARAN 211, DARAN 212, DARAN X-301, and DARAN X-801 have given satisfactory results. DARAN 225 is preferred because it is not brittle.

Whilst the spray is applied, it is preferable to have the container spinning about its longitudinal axis to permit a better distribution of the coating and insuring that the emulsion enters the exposed joints. Also, the spinning causes the emulsion to dry more rapidly. The spray can be either a cold or a hot spray. Other synthetic resin lacquers may be used for the lacquer such as acrylate resins, halocarbon plastics, polyethylene, epoxy resins, polyurethane resins, polyester resins, furan resins, silicon resins and other such synthetic resins.

After the lacquer has thoroughly dried, the can is ready to be filled with its oil content 21 and the upper end sealing disc 12 fastened thereon. A suitable sealing compound may be added about the upper periphery of the side wall 11 to provide a better seal with the top end sealing disc 12. With this type of paperboard container structure any grade of oil may form its contents. Also, the improved structure substantially eliminates leakage, thus preserving the container for longer periods of time than heretofore possible. Still further the handling of these containers is facilitated because of its improved sealing and more resistant side wall as the oil content does not weaken it by impregnation.

I claim:

1. A container for carrying oil, said container comprising,
   a continuous encircling, open ended, side wall of paper,
   a bottom end sealing disc secured to the bottom of said side wall,
   a homogeneous single oil impervios resin layer derived from a sprayed polyvinylidene chloride aqueous emulsion applied to the inner face of said side wall and exposed joints between said side wall and said bottom end,
   said impervious resin being partially impregnated into said side wall to a depth of at least 3 mils to anchor said resin layer which defines an oil receiving uninterrupted chamber within said side wall.

2. A container as claimed in claim 1 wherein there is further provided an outer wrapper on the outer surface of said cylindrical sidewall, said outer wrapper having a vertical seam spaced apart from said outer surface vertical seam.

3. A container as claimed in claim 1 wherein said polyvinylidene chloride emulsion is sprayed under pressure of between 100–120 lbs. onto said inner surface of said sidewall and said exposed joints whereby said polyvinylidene chloride emulsion impregnates said inner surface to a depth of approximately 3–5 mils and forms an inner lining of from 4–6 mils.

4. A container as claimed in clam 3 wherein said bottom end sealing disc is crimped to the bottom periphery of said side wall forming an interior joint with the inner surface of said side wall and a top sealing disc is secured to the top of said side wall.

5. A container as claimed in claim 1 wherein said side wall is cylindrical and convolute-wound from a plurality of turns of paper and having inner and outer longitudinally extending seams.

* * * * *

UNITED STATES PATENT OFFICE
CERTIFICATE OF CORRECTION

Patent No. 3,944,125              Dated March 16, 1976

Inventor(s) Jack Friedman

It is certified that error appears in the above-identified patent and that said Letters Patent are hereby corrected as shown below:

Column 1; line 63, after "perspective" add --view--.

Column 2; line 54, change "ect." to read --etc.--.

Column 3; line 7, change "con" to read --cone--;
Column 3; claim 1, line 29, change "impervios" to read
    --impervious--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*